E. MINGAY.
Utensils for Compressing Meat.
No. 133,791.  Patented Dec. 10, 1872.
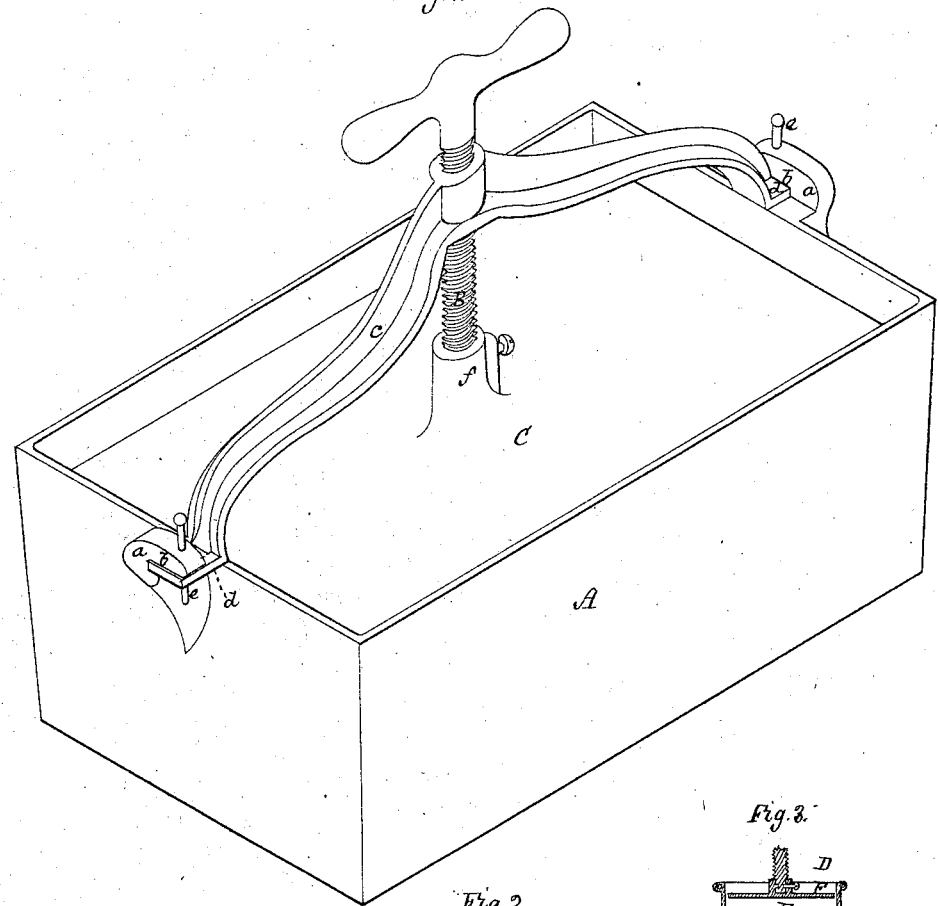

UNITED STATES PATENT OFFICE.

EDWARD MINGAY, OF BOSTON, MASSACHUSETTS.

IMPROVEMENT IN UTENSILS FOR COMPRESSING MEAT.

Specification forming part of Letters Patent No. 133,791, dated December 10, 1872.

*To all whom it may concern:*

Be it known that I, EDWARD MINGAY, of Boston, Suffolk county, Massachusetts, have invented a novel and useful Utensil for Compressing Meats, Expressing Juice from Fruits, and for other culinary purposes, of which the following is a specification:

My present invention is a metallic vessel, lined with porcelain to insure neatness and cleanliness and prevent corrosion and destruction, and provided with a removable bail or handle and a plunger or "press-head," applied thereto, and operated by a screw or its equivalent in such manner as to descend into the vessel and press powerfully therein any substance placed below it; and my invention may be said to consist, first, in lining a vessel or press of this character with porcelain or its equivalent; and, secondly, in the arrangement of a detachable handle and a plunger or presser, as before premised, and as hereinafter explained.

The drawing accompanying this specification represents, in Figure 1, a perspective view; Fig. 2, a vertical section of my invention; and Fig. 3 being a modification of the same.

In the drawing, A represents an oblong rectangular vessel of cast-iron, open at top, and lined with porcelain, after the manner and for the purpose practiced with many cooking utensils now in use. Upon each end and at the upper edge thereof I cast an ear or lug, $a$, each ear being formed with a notch, $b$, to receive the lower end of an arched bail or cross-head, $c$, which spans the vessel A longitudinally, and whose extremities terminate in lips $d$ to enter the notches $b$ before named, the said notches being so disposed as to present their openings in opposite directions, in order that when the bail is turned longitudinally out of a position longitudinal with the vessel it shall escape from contact with the ears, and be removed with its plunger from connection with the vessel. While the bail and plunger are in use the lips $d$ may be securely fastened to the lugs $a$ by pins $e$ passing through the two, as shown in the drawing. B in the accompanying drawing represents an upright screw which screws through the bale $c$, and is swiveled at its lower end within a boss or stud, $f$, erected upon the top of a thin rectangular flat plate or plunger, C, of a form corresponding to that of the vessel A, but of a size slightly less, in order to easily enter the latter, the upper end of the screw being provided with a suitable handle or wheel whereby it may be readily rotated.

The above-described utensil operates as follows, supposing the bale and plunger to be applied to the vessel A as shown in the drawing: The pins $e$ (if they are used) are to be removed, the bail turned obliquely with respect to the vessel A until the lips $d$ leave the notches $b$, when the bail and plunger are to be removed, and the viands or substances to be compressed are placed within the vessel, when the bail and plunger are to be returned, the pins inserted in place, and the plunger, by means of the screw B, lowered, with greater or less pressure, according to circumstances, the result being that the substance within the vessel is pressed to the extent desired.

Under the above construction my invention is applicable to the pressing of corned beef and other semi-solid viands or substances containing a comparatively small amount of liquid matter.

When it is desirable to use the invention for the preparation of jellies, or for expressing of juices from fruits, &c., I employ an auxiliary strainer, D, composed of a pot, E, open at top and having perforated sides or bottom, or both, and provided with feet $g$ $g$ to elevate it somewhat above the bottom of the vessel A. In using this strainer D the plunger C before used is to be detached from the screw and another, F, substituted, of a size and form to conform to the interior of the strainer E, this auxiliary plunger or presser being lowered within such strainer in the manner that the plunger C is lowered within the vessel.

In using the auxiliary strainer E the fruit or substance to be pressed is placed within the strainer and the plunger F lowered within it, the result being that the juices are thoroughly expressed, and, escaping through the perforations of the screen, are precipitated to the bottom of the vessel A.

In addition to the above-named uses the vessel A may be employed for cooking purposes; and in the making of jellies, &c., the ingredients may be cooked and afterward strained in the said vessel.

My invention provides a household utensil of great convenience and utility.

Claims.

1. A vessel for compressing various articles of food, as provided with a porcelain or equivlent lining, for purposes stated.

2. A vessel for compressing various articles of food, provided with a removable bail or cross-head, and a plunger or presser swiveled thereto, substantially in manner and for purposes stated.

3. In combination with the vessel A, bale c, and a suitable plunger, the strainer D, as and for the purposes stated.

EDWARD MINGAY.

Witnesses:
F. CURTIS,
W. E. BOARDMAN.